(12) United States Patent
Ranki et al.

(10) Patent No.: US 8,948,238 B2
(45) Date of Patent: Feb. 3, 2015

(54) HANDLING COMPLEX SIGNAL PARAMETERS

(75) Inventors: Ville Valtteri Ranki, Espoo (FI); Antti Paavo TapaniKainulainen, Espoo (FI); Fabio Belloni, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/883,809

(22) PCT Filed: Nov. 19, 2010

(86) PCT No.: PCT/IB2010/055298
§ 371 (c)(1),
(2), (4) Date: Aug. 5, 2013

(87) PCT Pub. No.: WO2012/066387
PCT Pub. Date: May 24, 2012

(65) Prior Publication Data
US 2013/0336375 A1    Dec. 19, 2013

(51) Int. Cl.
*H04B 3/46* (2006.01)
*H04W 24/08* (2009.01)
(Continued)

(52) U.S. Cl.
CPC ............... *H04W 24/08* (2013.01); *G01S 3/46* (2013.01); *H04L 1/20* (2013.01);
(Continued)

(58) Field of Classification Search
CPC ............ H04L 2025/03414; H04L 27/2647; H04L 27/362; H04L 2025/03426; H04L 27/2601; H04L 5/0048; H04L 27/2649; H04L 27/22; H04L 27/38; H04L 27/2053; H04L 27/2659; H04L 1/02; H04L 1/20; H04L 1/0631; H04B 1/0475; H04B 7/0602; H04B 7/0669; H04B 7/0871; H04B 7/0684; H04B 1/40; H04B 7/0413; H04B 17/0007; H04B 7/04; H04B 7/0689; H04B 17/005; G01S 2007/403; G01S 2007/4034; G01S 5/0221; G01S 3/043; G01S 19/36; G01S 2007/2886; G01S 2007/358; G01S 3/46; G01S 13/06; H01Q 1/2291

USPC ............... 375/267, 347, 346, 349, 224; 455/67.11, 101, 132, 501, 296, 500; 342/194, 195, 127, 129, 113, 126, 342/357.36, 357.63, 357.73, 357.76, 444
See application file for complete search history.

(56) References Cited

U.S. PATENT DOCUMENTS 5,586,192 A    12/1996    De Bijl et al.
7,209,716 B2 *  4/2007    Maeda et al. ............. 455/119
(Continued)

FOREIGN PATENT DOCUMENTS

| EP | 1674879 | 6/2006 |
| GB | 2384651 | 7/2003 |
| WO | 2010006651 A1 | 1/2010 |

OTHER PUBLICATIONS

International Search Report and Written Opinion received for corresponding Patent Cooperation Treaty Application No. PCT/IB2010/055298, dated Aug. 23, 2011, 11 pages.
(Continued)

*Primary Examiner* — Rahel Guarino
(74) *Attorney, Agent, or Firm* — Locke Lord LLP

(57) ABSTRACT

Apparatus, the apparatus having at least one processor and at least one memory having computer-readable code stored thereon which when executed controls the at least one processor to perform a method comprising: obtaining in-phase and quadrature samples of a received radio signal at least first and second discrete instances in time; processing the samples to provide information relating to the amplitude and/or phase of the received radio signal at the first and second instances in time; using the amplitude and/or phase information of the received radio signal at the first and second instances in time to determine whether interference is present on the received radio signal; forwarding the complex signal parameters for processing if interference is determined not to be present; and discarding the complex signal parameters without forwarding them for processing if interference is determined to be present.

20 Claims, 8 Drawing Sheets

(51) Int. Cl.
- *G01S 3/46* (2006.01)
- *H04L 1/20* (2006.01)
- *H04L 27/38* (2006.01)
- *G01S 3/04* (2006.01)
- *G01S 5/02* (2010.01)

(52) U.S. Cl.
CPC ............. *H04L 27/3818* (2013.01); *G01S 3/043* (2013.01); *G01S 5/0215* (2013.01)
USPC ........... 375/224; 375/267; 375/347; 375/346; 375/349; 455/67.11; 455/101; 455/132; 455/501; 455/296; 455/500; 342/194; 342/195; 342/127; 342/129; 342/113; 342/357.36; 342/357.63; 342/357.73; 342/357.76; 342/444; 342/126

(56) References Cited

U.S. PATENT DOCUMENTS

| | | |
|---|---|---|
| 2001/0012278 A1 | 8/2001 | Ma |
| 2003/0171099 A1 | 9/2003 | Kazakevich et al. |
| 2007/0111692 A1 | 5/2007 | Kuramoto et al. |
| 2007/0197229 A1 | 8/2007 | Kalliola et al. |
| 2008/0231512 A1 | 9/2008 | Yeshayahu |
| 2010/0161286 A1 | 6/2010 | Ranki et al. |
| 2010/0254325 A1 | 10/2010 | Narasimhan et al. |
| 2010/0283664 A1* | 11/2010 | Weber ............................ 342/159 |

OTHER PUBLICATIONS

Extended European Search Report for EP Application No. EP10859750, Date of Completion of Search: Jul. 2, 2014, 8 pages.

* cited by examiner

HANDLING COMPLEX SIGNAL PARAMETERS

RELATED APPLICATION

This application was originally filed as Patent Cooperation Treaty Application No. PCT/IB2010/055298filed Nov. 19, 2010.

FIELD OF THE INVENTION

The invention relates to the field of radio communications, and in particular to handling complex signal parameters. Non-exclusively, the invention relates to radio positioning.

BACKGROUND TO THE INVENTION

There are a number of known techniques for determining the position of an apparatus using radio frequency signals. Some popular techniques relate to use of the Global Positioning System (GPS), in which multiple satellites orbiting Earth transmit radio frequency signals that enable a GPS receiver to determine its position. However, GPS is often not very effective in determining an accurate position indoors.

Some non-GPS positioning techniques enable an apparatus to determine its position indoors. However, many of these techniques do not result in an accurate position being determined, and others suffer from other disadvantages.

SUMMARY OF THE INVENTION

A first aspect of the invention provides a method comprising:
  obtaining in-phase and quadrature samples of a received radio signal at at least first and second discrete instances in time;
  processing the samples to provide information relating to the amplitude and/or phase of the received radio signal at the first and second instances in time;
  using the amplitude and/or phase information of the received radio signal at the first and second instances in time to determine whether interference is present on the received radio signal;
  forwarding the complex signal parameters for processing if interference is determined not to be present; and
  discarding the complex signal parameters without forwarding them for processing if interference is determined to be present.

If the received signals phase or frequency modulated signals, the method may comprise comparing an amplitude of the received radio signal at the first instance in time with an amplitude of the received signal at the second instance in time; and determining whether interference is present on the basis of the result of the comparison. Here, the first and second instances in time may be located within a single packet.

The method may comprise controlling a switch to connect different ones of plural antenna elements to a radio receiver in a sequence, wherein the first and second instances of time are separated from one another by at least one switching of the switch.

The method may comprise comparing an amplitude of a signal of the received radio signal at a third discrete instance in time with an amplitude of a signal at a fourth discrete instance in time, and determining whether interference is present on the basis of the result of both of the comparisons.

The method may comprise determining whether interference is present on the basis of results of comparisons of amplitudes of signals for each of the plural antenna elements at different instances in time, and determining whether interference is present on the basis of the result of all of the comparisons.

Alternatively, the method may comprise removing modulation and frequency offset from the received signals and then comparing a phase and/or amplitude parameter of a signal relating to a first antenna element at the first instance in time with a corresponding parameter of a signal relating to the first antenna element at the second instance in time, and determining whether interference is present on the basis of the result of the comparison.

Further alternatively, the method may comprise:
  controlling a switch to connect different ones of plural antenna elements to a radio receiver in a sequence, wherein the first and second instances of time are separated from one another by at least one switching of the switch;
  removing modulation and frequency offset from the received signals and then comparing a phase and/or amplitude parameter of a signal relating to a first antenna element at the first instance in time with a corresponding parameter of a signal relating to the first antenna element at the second instance in time, the first and second instances in time being separated from one another by at least one switching of the switch; and
  determining whether interference is present on the basis of the result of the comparison.

In either of these alternatives, the first and second instances in time may be located within a single packet.

The method may comprise comparing a phase and/or amplitude parameter of a signal relating to a second antenna element at a third instance in time with a corresponding parameter of a signal relating to the second antenna element at a fourth instance in time, and determining whether interference is present on the basis of the result of both of the comparisons.

The method may comprise comparing a phase and/or amplitude parameter of a signal relating to a second antenna element at a third instance in time with a corresponding parameter of a signal relating to the second antenna element at a fourth instance in time, the third and fourth instances in time being separated from one another by at least one switching of the switch, and determining whether interference is present on the basis of the result of both of the comparisons.

The method may comprise determining whether interference is present on the basis of results of comparisons of phase and/or amplitude parameters of signals for each of the plural antenna elements at different instances in time.

A second aspect of the invention provides a method comprising:
  determining whether interference is present on a currently received phase or frequency modulated signal by comparing an amplitude of a signal relating to a first antenna element at a first instance in time with an amplitude of a signal relating to the first antenna element at a second instance in time;
  discarding the complex parameters without forwarding them for processing if interference is determined to be present; and
  if interference is determined not to be present:
    removing modulation and frequency offset from the received signals and then determining whether interference is present by comparing a phase of the signal relating to the first antenna element at the first instance in time with a phase of the signal relating to the first antenna element at a second instance in time;

discarding the complex parameters without forwarding them for processing if interference is determined to be present; and forwarding the complex parameters for processing if interference is determined not to be present.

This method may comprise controlling a switch to sequentially switch different ones of plural antenna elements to connect to a radio receiver, wherein the first and second instances in time being separated from one another by at least one switching of the switch.

The invention also provides a computer program that when executed by computing apparatus controls it to perform a method as recited above.

A third aspect of the invention provides apparatus comprising:
  means for obtaining in-phase and quadrature samples of a received radio signal at at least first and second discrete instances in time;
  means for processing the samples to provide information relating to the amplitude and/or phase of the received radio signal at the first and second instances in time;
  means for using the amplitude and/or phase information of the received radio signal at the first and second instances in time to determine whether interference is present on the received radio signal;
  means for forwarding the complex signal parameters for processing if interference is determined not to be present; and
  means for discarding the complex signal parameters without forwarding them for processing if interference is determined to be present.

A fourth aspect of the invention provides apparatus comprising:
  means for determining whether interference is present on a currently received phase or frequency modulated signal by comparing an amplitude of a signal relating to a first antenna element at a first instance in time with an amplitude of a signal relating to the first antenna element at a second instance in time;
  means for discarding the complex parameters without forwarding them for processing if interference is determined to be present; and
  means for if interference is determined not to be present:
    removing modulation and frequency offset from the received signals and then determining whether interference is present by comparing a phase of the signal relating to the first antenna element at the first instance in time with a phase of the signal relating to the first antenna element at a second instance in time;
    discarding the complex parameters without forwarding them for processing if interference is determined to be present; and
    forwarding the complex parameters for processing if interference is determined not to be present.

A fifth aspect of the invention provides apparatus, the apparatus having at least one processor and at least one memory having computer-readable code stored thereon which when executed controls the at least one processor to perform a method comprising:
  obtaining in-phase and quadrature samples of a received radio signal at at least first and second discrete instances in time;
  processing the samples to provide information relating to the amplitude and/or phase of the received radio signal at the first and second instances in time;
  using the amplitude and/or phase information of the received radio signal at the first and second instances in time to determine whether interference is present on the received radio signal;
  forwarding the complex signal parameters for processing if interference is determined not to be present; and
  discarding the complex signal parameters without forwarding them for processing if interference is determined to be present.

A sixth aspect of the invention provides apparatus, the apparatus having at least one processor and at least one memory having computer-readable code stored thereon which when executed controls the at least one processor:
  determining whether interference is present on a currently received phase or frequency modulated signal by comparing an amplitude of a signal relating to a first antenna element at a first instance in time with an amplitude of a signal relating to the first antenna element at a second instance in time;
  discarding the complex parameters without forwarding them for processing if interference is determined to be present; and
  if interference is determined not to be present:
    removing modulation and frequency offset from the received signals and then determining whether interference is present by comparing a phase of the signal relating to the first antenna element at the first instance in time with a phase of the signal relating to the first antenna element at a second instance in time;
    discarding the complex parameters without forwarding them for processing if interference is determined to be present; and
    forwarding the complex parameters for processing if interference is determined not to be present.

A seventh aspect of the invention provides non-transitory computer-readable storage medium having stored thereon computer-readable code, which, when executed by computing apparatus, causes the computing apparatus to perform a method comprising:
  obtaining in-phase and quadrature samples of a received radio signal at at least first and second discrete instances in time;
  processing the samples to provide information relating to the amplitude and/or phase of the received radio signal at the first and second instances in time;
  using the amplitude and/or phase information of the received radio signal at the first and second instances in time to determine whether interference is present on the received radio signal;
  forwarding the complex signal parameters for processing if interference is determined not to be present; and
  discarding the complex signal parameters without forwarding them for processing if interference is determined to be present.

An eighth aspect of the invention provides non-transitory computer-readable storage medium having stored thereon computer-readable code, which, when executed by computing apparatus, causes the computing apparatus to perform a method comprising
  determining whether interference is present on a currently received phase or frequency modulated signal by comparing an amplitude of a signal relating to a first antenna element at a first instance in time with an amplitude of a signal relating to the first antenna element at a second instance in time;

discarding the complex parameters without forwarding them for processing if interference is determined to be present; and if interference is determined not to be present:

removing modulation and frequency offset from the received signals and then determining whether interference is present by comparing a phase of the signal relating to the first antenna element at the first instance in time with a phase of the signal relating to the first antenna element at a second instance in time;

discarding the complex parameters without forwarding them for processing if interference is determined to be present; and forwarding the complex parameters for processing if interference is determined not to be present.

A ninth aspect of the invention provides apparatus comprising:

a controller;

plural antenna elements;

a switch having plural inputs and an output;

a radio receiver configured to provide I and Q complex parameters of received signals;

wherein the antenna elements are connected to respective inputs of the switch and the radio receiver is connected to the output of the switch, the controller being configured:

to obtain in-phase and quadrature samples of a received radio signal at at least first and second discrete instances in time;

to process the samples to provide information relating to the amplitude and/or phase of the received radio signal at the first and second instances in time;

to use the amplitude and/or phase information of the received radio signal at the first and second instances in time to determine whether interference is present on the received radio signal;

to forward the complex signal parameters for processing if interference is determined not to be present; and to discard the complex signal parameters without forwarding them for processing if interference is determined to be present.

A tenth aspect of the invention provides apparatus comprising:

a controller;

plural antenna elements;

a switch having plural inputs and an output;

a radio receiver configured to provide I and Q complex parameters of received signals;

wherein the antenna elements are connected to respective inputs of the switch and the radio receiver is connected to the output of the switch, the controller being configured:

to determine whether interference is present on a currently received phase or frequency modulated signal by comparing an amplitude of a signal relating to a first antenna element at a first instance in time with an amplitude of a signal relating to the first antenna element at a second instance in time;

to discard the complex parameters without forwarding them for processing if interference is determined to be present; and if interference is determined not to be present:

to remove modulation and frequency offset from the received signals and then determining whether interference is present by comparing a phase of the signal relating to the first antenna element at the first instance in time with a phase of the signal relating to the first antenna element at a second instance in time;

to discard the complex parameters without forwarding them for processing if interference is determined to be present; and to forward the complex parameters for processing if interference is determined not to be present.

BRIEF DESCRIPTION OF THE DRAWINGS

For a better understanding of various embodiments of the present invention reference will now be made by way of example only to the accompanying drawings in which.

DETAILED DESCRIPTION OF EMBODIMENTS OF THE INVENTION

Figure 1:
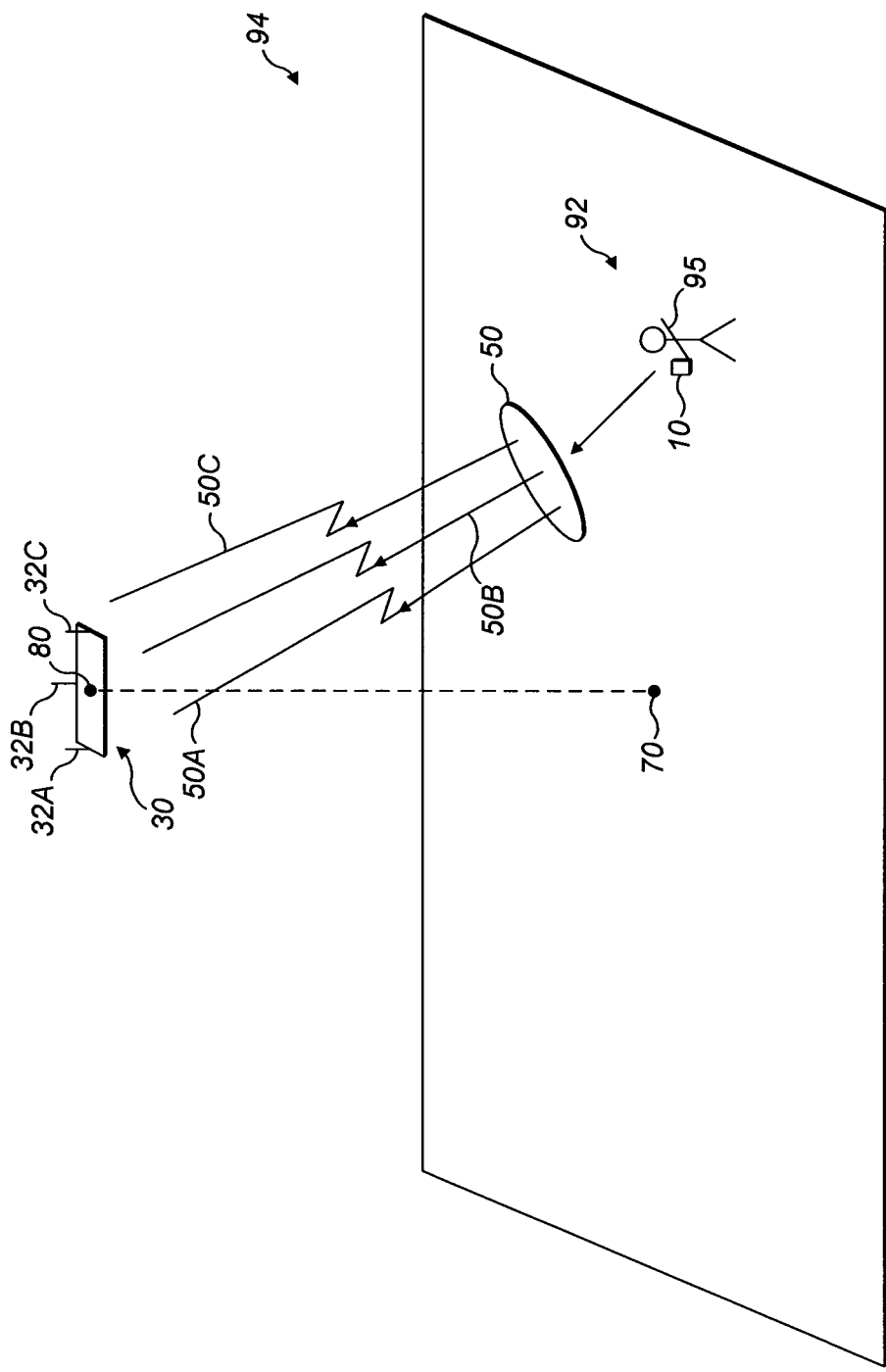
FIG. 1 illustrates a base station apparatus according to aspects of the invention receiving radio signals from a transmitter according to other aspects of the invention.

FIG. 1 illustrates a person 92 (carrying a mobile radio communications apparatus 10) at a position 95 on a floor 100 of a building 94. The building 94 could be, for example, a shopping centre or a conference centre. The mobile radio communications apparatus 10 is hereafter referred to as a mobile device. The mobile device 10 includes radio transmitter functionality and so can be called a transmitter. The mobile device 10 is operable to transmit radio signals that are receivable by the base station 30, for instance Bluetooth Low Energy (BT LE) protocol signals.

A base station receiver apparatus 30 is positioned at a location 80 of the building 94. In the illustrated example, the location 80 is on the ceiling of the building 94 (i.e. the overhead interior surface) but in other implementations the receiver may be placed elsewhere, such as on a wall or within an under-floor cavity. For reasons that will become apparent, the base station receiver apparatus 30 can be termed a positioning device or positioning receiver.

The location 80 is directly above the point denoted with the reference numeral 70 on the floor 100 of the building. The base station 30 is for enabling the position of the mobile device 10 to be determined, although that is not necessarily the only function provided by the base station 30. For example, the base station 30 may be part of a transceiver for providing wireless internet access to users of apparatuses 10, for example, via wireless local area network (WLAN) or Bluetooth Low Energy radio signals.

Briefly, the mobile device 10 transmits signals which are received at the base station 30. The base station 30 takes I and Q samples of the received signals. These I and Q samples are processed to determine a bearing of the mobile device 10 from the base station 30. From the bearing, the location of the mobile device 10 may be calculated. Calculation of the bearing from the I and Q samples, or alternatively from part-processed I and Q samples, may be performed by the base station 30, or externally to the base station. If bearing calculation is performed externally to the base station 30, I and Q samples or part-processed samples of the received signals are sent from the base station 30 to a server (not shown).

Briefly, the base station 30 is configured to determine whether received signals are subject to interference and to use the signals for positioning, or send the signals for positioning, only if it is determined that the signals are not subject to interference.

Figure 2:
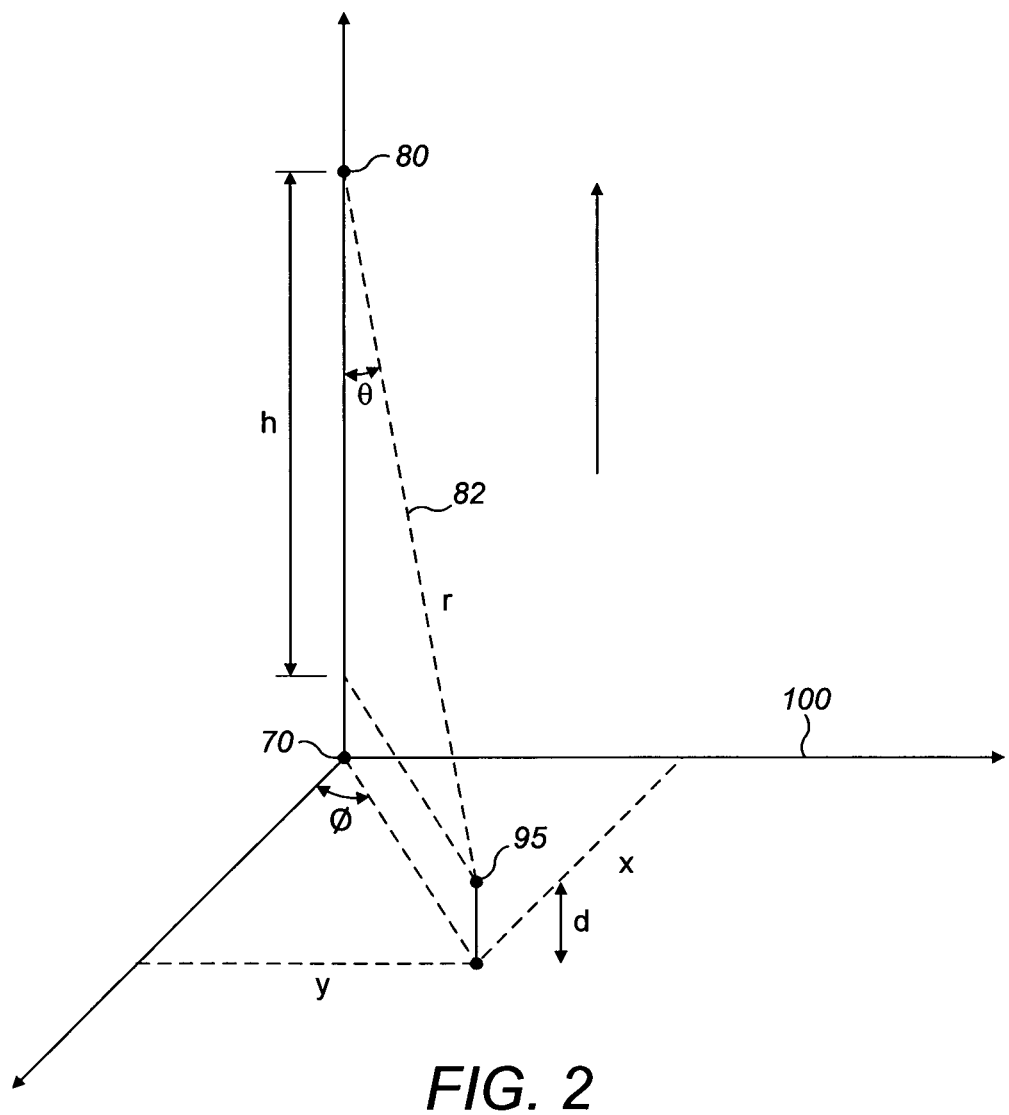
FIG. 2 illustrates geometry of the FIG. 1 scenario.

The position 95 of the person 92 is defined by specifying a position along a bearing 82 (illustrated in FIG. 2) which runs from the location 80 of the base station 30 through the location 95 of the mobile device 10. The bearing 82 is defined by an elevation angle $\theta$ and an azimuth angle $\phi$.

The mobile device 10 may, for example, be a hand portable electronic device such as a mobile radiotelephone. The mobile device 10 may or may not include a positioning receiver such as a GPS receiver. The mobile device 10 may be a relatively simple device having limited functionality, such as a mobile tag. Here, the mobile tag 10 may be absent of a receiver. A mobile tag is absent of voice communication capability, and may also be absent of a display and audio transducers.

The mobile device 10 may transmit radio signals 50 periodically as beacons. The radio signals may, for example, have a transmission range of 100 meters or less. For example, the radio signals may be 802.11 wireless local area network (WLAN) signals, Bluetooth signals, Ultra wideband (UWB) signals or Zigbee signals. In the following embodiments, the radio signals preferably are signals transmitted according to the Bluetooth Low Energy protocol.

Figure 3:
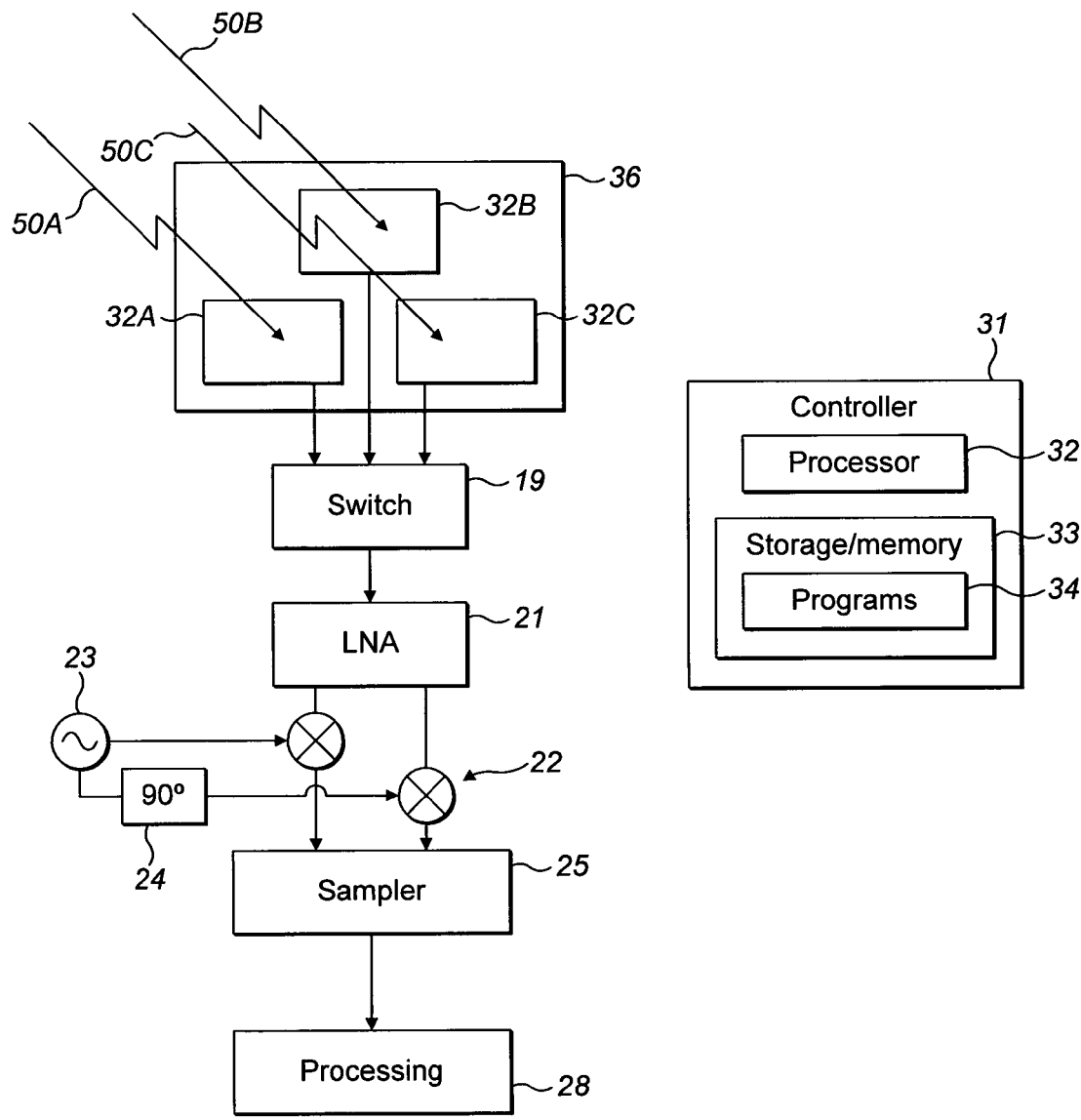
FIG. 3 schematically illustrates one example of part of the base station of FIG. 1.

FIG. 3 schematically illustrates one example of part of the base station 30. The base station 30 comprises an antenna array 36 comprising a plurality of antenna elements 32A, 32B, 32C which receive respective radio signals 50A, 50B, 50C transmitted from the mobile device 10. Although three antenna elements 32 are shown, three is the minimum and the embodiments described here may include more, for instance 16 elements. In embodiments described below, 10 elements are present.

Each of the plurality of antenna elements 32A, 32B, 32C is connected to an switch 19, which is controllable by a controller 31 as described below. The switch 19 is controlled so that only one of the antenna elements 32A, 32B, 32C is connected to an amplifier 21 at a given time. The output of the amplifier 21 are received at a mixer arrangement 22. This is provided with in-phase (I) and quadrature (Q) signals by an arrangement of a local oscillator 23, which may be analogue or digital, and a 90° phase shifter 24. A sampler 25 is configured to receive I and Q output signals from the mixer arrangement and take digital samples thereof. The sampler 25 may take any suitable form, for instance including two digital to analogue converter (DAC) channels, one for the I channel and one for the Q channel. The effect of the mixer arrangement 24 and the sampler 25 is to downconvert the received signals and to provide digital I and Q samples of the downmixed signals.

An output of the sampler 25 is provided to a processing module 28.

Figure 7:
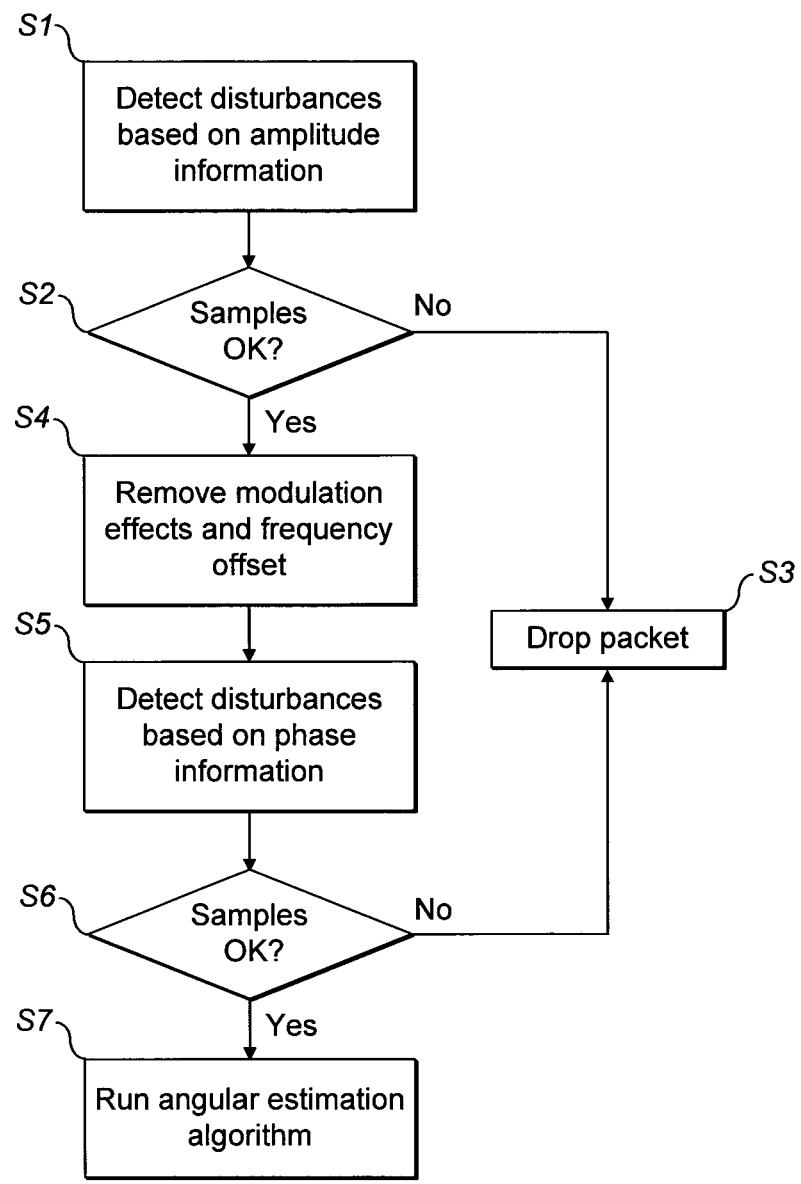
FIG. 7 is a flowchart illustrating operation of the base station in some embodiments of the invention.

A controller 31 is configured to control the other components of the base station apparatus 30. The controller may take any suitable form. For instance, it may comprise processing circuitry 32, including one or more processors, and a storage device 33, comprising a single memory unit or a plurality of memory units. The storage device 33 may store computer program instructions 34 that, when loaded into processing circuitry 32, control the operation of the base station 30. The computer program instructions 34 may provide the logic and routines that enables the apparatus to perform the functionality described above, and also to perform the method described below with reference to FIGS. 5 and 7. The processing module 28 may be comprised solely of the controller 31. The computer program instructions 34 may arrive at the base station apparatus 30 via an electromagnetic carrier signal or be copied from a physical entity 21 such as a computer program product, a memory device or a record medium such as a CD-ROM or DVD.

The processing circuitry 32 may be any type of processing circuitry. For example, the processing circuitry 32 may be a programmable processor that interprets computer program instructions 34 and processes data. The processing circuitry 32 may include plural programmable processors. Alternatively, the processing circuitry 32 may be, for example, programmable hardware with embedded firmware. The processing circuitry 32 may be a single integrated circuit or a set of integrated circuits (i.e. a chipset). The processing circuitry 32 may also be a hardwired, application-specific integrated circuit (ASIC). The processing circuitry may be termed processing means.

The processing circuitry 32 is connected to write to and read from the storage device 33. The storage device 33 may be a single memory unit or a plurality of memory units.

The controller 31 operates to control the switch 19 to connect the antenna elements 32A, 32B, 32C to the amplifier 21 in turn. The controller 31 controls the switch 19 to connect one of the antenna elements 32A, 32B, 32C to the amplifier for the duration of transmission of the header of a packet transmitted by the mobile device 10. After the header has been received, the controller 31 controls the switch 19 to connect different one of the antenna elements 32A, 32B, 32C to the LNA 21 in a sequence. The interval between successive switching of the switch 19 is approximately equal to the symbol rate used in the payload of the transmitted packets.

The base station 30, in particular the processing module 28, is configured to use parameters of complex signals received from the sampler 25 to calculate a bearing to the mobile device 10 from the base station 30. The way in which bearing calculation is performed is outside the scope of this specification but is described in, for instance, co-pending application nos. PCT/IB2010/054426 and PCT/IB2010/054905, the contents of which are incorporated herein by reference.

Instead of calculating the bearing to the mobile device 10, the base station may transmit relevant information for remote processing. In this case, the base station 30, in particular the controller 31, is configured to form a message including the I and Q samples or alternatively part-processed samples, and the identifier received from the mobile device 10 and to transmit the message to the remote server through a communications interface (not shown in the figure), which may include one or more of the antenna elements 32A, 32B, 32C.

The message may include plural packets, each including a header and a payload. The headers of the packets include an identifier relating to and identifying the base station 30, and the address of the remote server. The payloads include the I and Q samples, or part-processed information, and the identifier demodulated from the signals received by the base station 30. The I and Q samples and identifier relating to one signal received at the base station 30 may be included in one packet, or split across multiple packets. One packet may include I and Q samples and identifiers relating to two or more signals received at the base station 30, although advantageously each packet relates to only one signal.

In a prototype system constructed by the inventors, sixteen antenna elements 32A are used. In this system, each antenna element is sampled twice although one antenna element (a reference element) is sampled more frequently. Performing three measurements results in 104 samples which, with one byte for each I and Q sample, totals 208 bytes of data. These bytes are included in the message.

The I and Q samples constitute complex signal parameters in that the I and Q samples together define parameters of a complex signal.

Instead of processing 'raw' I and Q samples, the controller 31 may process the I and Q samples to provide other complex signal parameters relating to the received signals, from which bearing calculation can be performed. For instance, the controller 31 may provide averaging of the I and Q samples in the angle/phase domain before converting the averages back to the I and Q domain (one sample for each antenna) and providing the averaged samples as complex signal parameters. Alternatively, the controller 31 may calculate amplitude and/or phase information from the I and Q samples, and provide the amplitude, phase or phase and amplitude information as complex signal parameters Whatever form is taken by the complex signal parameters, they are included in a message as described above.

The message is transmitted to the remote server, for instance using radio signals. The radio signals may have a transmission range of 100 meters or less. For example, the radio frequency signals may be 802.11 wireless local area network (WLAN) signals, Bluetooth or Bluetooth Low Energy signals, Ultra wideband (UWB) signals or Zigbee signals.

The use of a single radio channel and rapid switching between antennas causes a problem in that conventional bit error checking cannot be used to detect disturbances in signal reception (e.g. interference). Typically, quality of a data packet is determined by bit error checking. Disturbances in signal reception can cause incorrect bearing calculations, and it is an aim of this specification to provide reliable detection with relatively little signal processing.

Briefly, this specification describes a technique for detecting and discarding packets that have been corrupted, for example, by interference with other packets. If a packet is corrupted it is not used for positioning. Identification of corrupted packets allows saving computational resources and power while preserving the overall system accuracy. Also, bearing calculation can be improved since signals subject to interference cannot compromise the calculations.

'Packet' is used here to denote I and Q samples, or complex signal parameter information derived from samples, that originate from one received signal. The packet relates to multiple antenna elements, and advantageously all the antenna elements.

Figure 4:
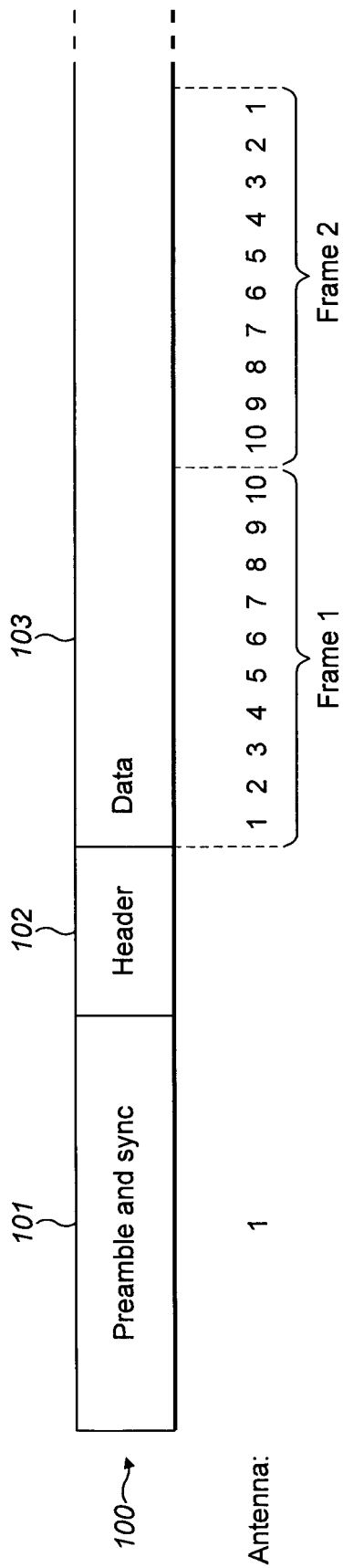
FIG. 4 illustrates a beacon message as transmitted by the mobile station of FIG. 1.

FIG. 4 illustrates a beacon message or positioning packet as transmitted by the mobile station 10, and shows switching between antenna elements and the base station 30 when receiving a positioning packet from the mobile device 10. The beacon message 100 comprises three key sections, namely a preamble and sync section 101, a header 102 and a data section 103. The purpose of the preamble and sync section 101 is to allow a receiver to synchronise itself with the transmissions. To this end, the preamble and sync section 101 may include alternating zeros and ones. The header 102 includes various information, including information identifying the mobile device 10. The header 102 may also indicate a transmit power of the mobile device 10.

The data section 103 does not include any information content. The purpose of the data section 103 is to enable a receiver, such as the base station 30, to be able to calculate a bearing to the mobile device from the receiver. In this example, the data comprises a sequence of ones. The data is notionally formed into a number of frames, two of which are shown at frame 1 and frame 2 in the figure. When receiving the data section 103, the base station 30 switches between different ones of the antenna elements. However, when receiving the preamble and sync section 101 and the header 102, switching is disabled so that only one of the antenna elements is connected to the receiver. In this example, it is the first antenna element that is connected to the receiver when the preamble and sync and header sections 101, 102 are being received.

Shown beneath the beacon signal 100 is an indication of the antenna element of the base station 30 that is connected to the receiver circuitry at a time corresponding to a part of the beacon 100. As shown, a first antenna element, for instance the antenna element 32A of FIG. 3, is connected to the receiver circuitry for the duration of transmission of the preamble and sync and header sections 101, 102 and for the first one-tenth of the frame 1 of the data section 103. The controller 31 controls the switch such that the antenna elements are connected to the receiver in turn. Each of ten antenna elements is connected in sequence to the receiver circuitry for equal periods of time in the first frame, in the sequence 1 . . . 10. This is shown in the section marked "frame 1" in the Figure, in which it can be seen that the controller 31 causes to be connected to receiver firstly the first antenna element, then the second antenna element, and so on up to the tenth antenna element.

At the end of the first frame, a second frame, labelled "frame 2" in the Figure, commences. In the second frame, the controller operates the switch so as to reverse the sequence of connection of antenna elements to the receiver. In particular, the controller causes the tenth antenna element to be connected to the receiver, followed by the ninth, the eight and so on until the first antenna element is connected to the receiver. The interval between successive switching is the same for each of the antenna elements, and is the same in the second frame as it is in the first frame. As such, the length of the second frame is the same as that of the first frame.

The switching interval is dependent on the hardware of the receiver, in particular the RF switch and filters. A faster switch and wider filters allow a shorter switching interval. It will be appreciated that the filter width however depends on the radio protocol. WLAN has wider filters than Bluetooth, for example. Bypassing the filters when performing RF switching means that the limiting factor is the switching speed of the switch. With standard filters (i.e. no hardware modifications to the receiver), a suitable switching interval for Bluetooth Low Energy is <1 MHz and is <10 MHz (for WLAN).

Figure 5:
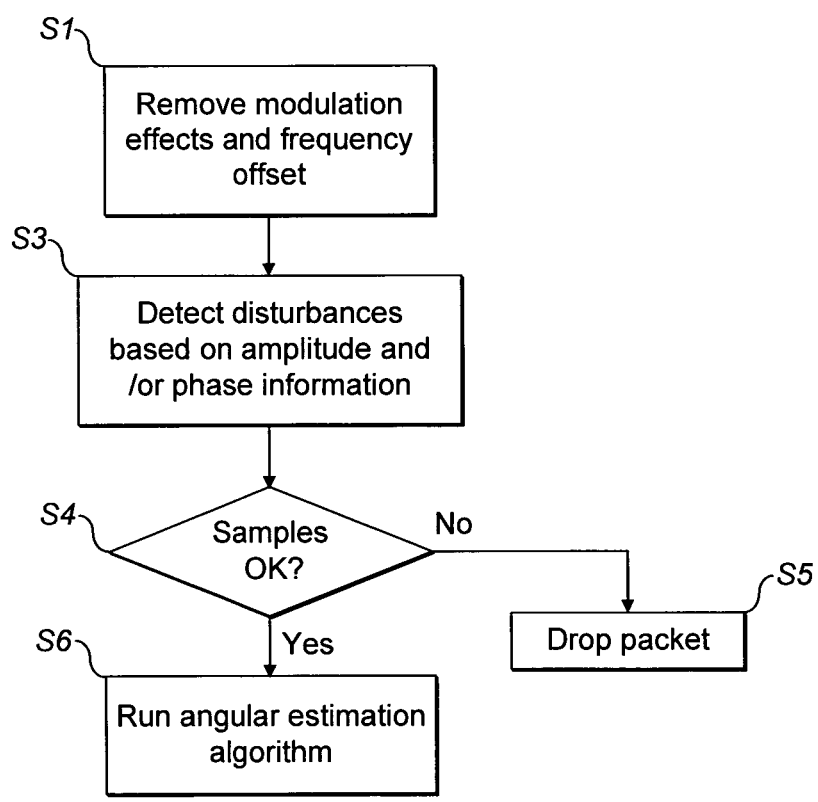
FIG. 5 is a flowchart illustrating operation of the base station in some embodiments of the invention.

FIG. 5 is a flowchart illustrating operation of the base station in some embodiments of the invention.

The flowchart of FIG. 5 relates to the handling of samples of signals that have been received using the antenna switching pattern shown in FIG. 4. At step S1, modulation effects and frequency offset are removed from the samples. After removing the modulation and frequency offset, the amplitude and phase of the received samples depend among other things on the location and orientation of the antenna element 32A, 32B, 32C, the bearing to the mobile device 10 and the distance to the mobile device 10.

At step S2, disturbances are detected based on amplitude information, on phase information or on amplitude and phase information that is derived from the samples. At S3 it is determined whether disturbance is present. In the event of a detection of the presence of disturbance, the samples are dropped at step S5. Dropping the samples in this collection means that the samples are not used for determining a bearing of the mobile device 10 from the base station 30. If a positive determination yields from step S4, at step S6 the samples are processed to determine a bearing of the mobile device 10 from the base station 30.

A technique by which the process in module 28 is able to detect disturbances in the received signals will now be described in reference to FIG. 6.

Figure 6A:
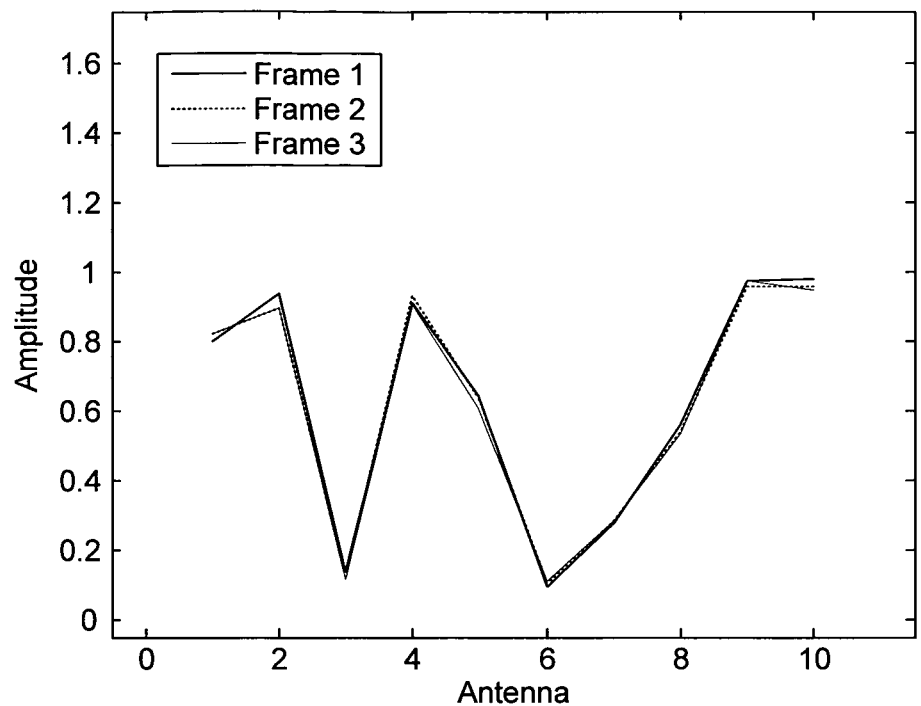
FIGS. 6A and 6B show measurements obtained by the FIG. 3 base station in two different situations.

In FIG. 6A, amplitude information from each of the ten antenna elements for 3 consecutive frames of the data part 103 of the beacon 100 are plotted on a chart. It will be seen from FIG. 6A that the amplitude of the signal varies significantly for different antenna elements within a given frame. However, the amplitude value for a given antenna element is approximately the same as the amplitude value for the same antenna element in each of the frames. As such, a line connecting the antenna elements for a given frame substantially coincides with lines connecting the antenna elements for the other frames.

Figure 6B:
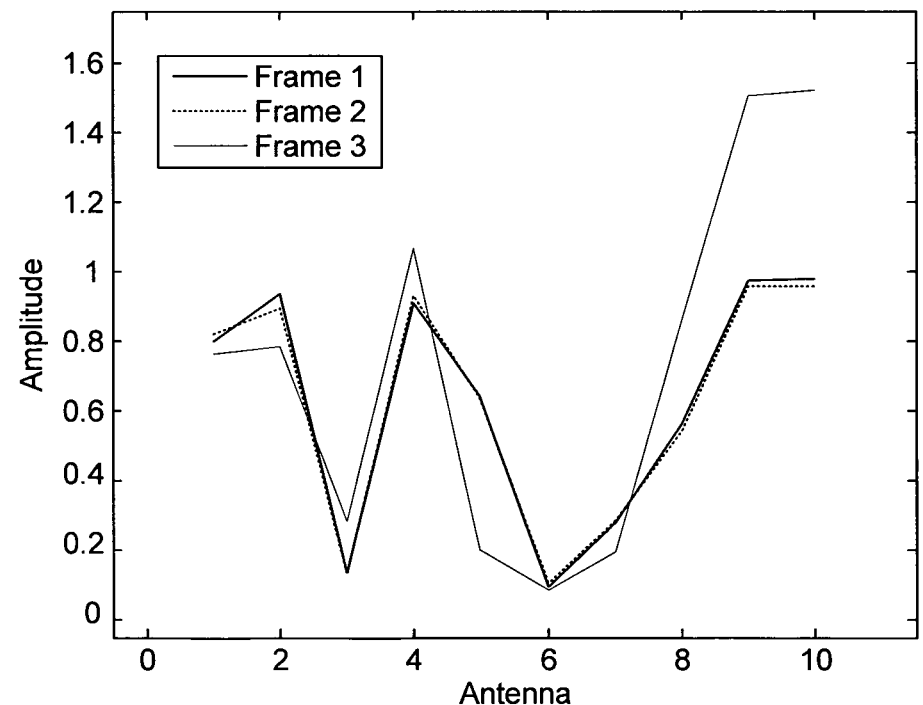

FIG. 6B shows amplitude values resulting from receiving a signal in the presence of interference. It will be seen from FIG. 6B that there are significant discrepancies between the amplitude values for a given antenna element between the different frames. As such, lines connecting the antenna elements for a given frame do not coincide with lines connecting the antenna elements for other frames. In FIG. 6B, though, there is substantial correspondence between the lines for frame 1 and frame 2, at least for antenna elements numbered 3 to 10, although not for antenna elements 1 and 2 between frames 1 and 2 nor for the whole of frame 3.

If one or more other systems are transmitting at the same time and frequency as the mobile device 10, the received samples might be affected by this interference. It is considered to be unlikely that the effect of interference remains constant for extended period of time. Thus if the amplitudes and/or phases of two samples measured with a given antenna element are different at different times (after frequency correction), it is considered to be likely that there is interference. In this case, the packet should be discarded without being used to determine a bearing. The inventors consider that the time between the two measurements should be short so that the movement of the mobile device 10 does not affect the results, but the time should also long enough that slowly changing interference can be detected. In practice, the measurements are considered to be best performed within a single packet, but not adjacent to each other. Measuring other antennas in between two successive measurements of one antenna element ensures that the two measurements are not adjacent.

It may be sufficient to repeat the looping through the antenna elements only partially, although the inventors have found that better results are obtained if looping is preformed two, or more, times. The detection of the interference is then more accurate as all samples can be used in the comparison. In addition, some bearing estimation algorithms benefit from having more than one sample from each antenna element.

In the system described above, all the antenna elements are cycled through twice in a ramp-up/ramp-down manner (for example 1 2 3 . . . n n . . . 3 2 1). This allows simple removal of the frequency offset by simply averaging the two samples for each antenna.

Disturbance may be inferred by the controller 31 in any suitable way. For instance, the controller 31 may determine whether the amplitude values for a given antenna element meet a predetermined criteria with respect to the amplitude values for the same antenna element in other frames. The predetermined criteria might for instance be that the values are within a threshold distance of one another. The threshold may be expressed as a proportion of one value, but is expressed as an absolute value. Disturbance may be inferred if the predetermined relationship is not met in respect of a predetermined number of antenna elements. In one alternative, disturbance may be inferred if the predetermined criteria is not met in respect of only one antenna element, or alternatively a failure to meet the criteria in respect of at least 2 elements may be required to infer the presence of disturbance.

A suitable predetermined criteria might be that the amplitudes are within, say, 2 dB of each other. Alternatively, in some embodiments amplitudes are given by a number between 0 and 255 (equating to one byte), and the predetermined criteria is set as a maximum difference of a certain number of units. In some embodiments, it is required that the frames are within 10 units of each other. An advantage of this is that some antenna elements in the base station 30 may receive very low power (e.g. due to being at the opposite side of the direction from which the signal originates) and thus are close to noise level where the change in dB between frames due to noise almost always will exceed 2 dB.

In some embodiments, the packet is dropped if there is disturbance on any frame. In other embodiments, as long as more than two frames are measured, dropping bad frames and not the whole packet allows data that is free from interference to be used to calculate a bearing.

In the operation of FIG. 5, the comparison of samples can be based in amplitude and/or phase information. In systems utilizing phase or frequency modulation (constant amplitude), it is advantageous to use only amplitude information because amplitude information can be used for comparison before any processing of the I and Q samples is performed. A method of operation of the base station 30 suitable for use in systems using phase or frequency modulation (e.g. Bluetooth low energy) will now be described with reference to FIG. 7.

Firstly, at step S1, it is determined whether disturbances are present based on amplitude information. This can be performed in any suitable way.

At step S2, it is determined where the disturbance has been detected. If disturbance has been detected, at step S3 the samples are dropped. Otherwise, at step S4 the process in module 28 removes modulation effects and frequency off set from the received signals. Following step S4, a determination is made as to whether disturbances are present in the received signal based on phase information at step S5. If at step S6 it is determined that disturbances are present, the samples are dropped at step S3. Otherwise, the samples are processed to determine a bearing to the mobile device 10 at step S7.

Figure 8:
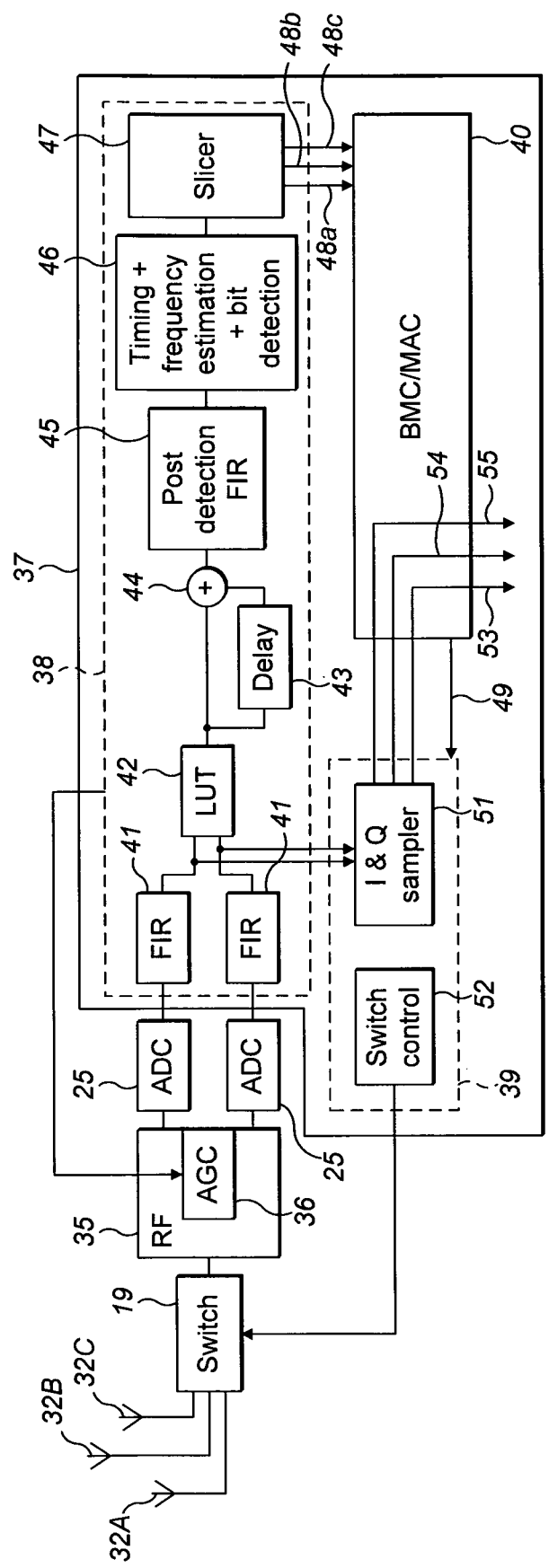
FIG. 8 is a block diagram illustrating one possible form for the base station of FIG. 3.

FIG. 8 is a block diagram illustrating one possible form for the base station 30, including some detail of the processing module 28. Reference numerals are retained from FIG. 3 for like elements.

At the output of the switch 19, an RF module 35 is connected. The RF module 35 includes an automatic gain control (AGC) part 36, which has a gain control input. The sampler 25, in the form of two analogue to digital converters, is connected to outputs of the RF module 35. The components thus far described are implemented in hardware, and all of the other components shown in FIG. 8 are implemented on a field programmable gate array (FPGA) 37. The FPGA 37 includes 3 main blocks, namely a Bluetooth low energy receiver base band (BT LE BB) module 38, an antenna switching and I and Q sampling module 39 and a burst mode controller/media access controller (BMC/MAC) module 40. The control input of the AGC 36 is provided by the BT LE BB module 38.

Outputs of the sampler 25 are connected to 2 parallel finite impulse response (FIR) filters 41. Outputs of the FIR filters 41 are connected to inputs of a look up table (LUT) 42. An output of the LUT 42 is connected both to an input of a delay element 43 and to an input of a summer 44. The other input of the summer 44 is connected to the output of the delay element 43. An output of the summer 44 is connected to a post detection FIR filter 45. A timing and frequency estimation and bit detection module 46 is connected to an output of the post detection FIR filter 45. A slicer 47 is connected to an output of the timing and frequency estimation and bit detection module 46 and receives information bits therefrom.

The slicer provides 3 outputs to the BMC/MAC module 40. A first 48a carries a preamble found signal. A second 48b carries a sync found signal and a third 48c carries information bits.

A first output of the BMC/MAC module 40 is connected to an antenna switching on/off input of the antenna switching module 39.

The antenna switching and I and Q sampling module 39 includes an I and Q sampler 51 and a switch controller 52. The I and Q sampler has inputs connected to the outputs of the FIR filters 41. The I and Q sampler 51 provides 8 byte samples of I and Q signals respectively on first and second outputs 53, 54. The I and Q sampler 51 provides an AGC output 55. The three outputs of the I and Q sampler 51 are connected to inputs of the BMC/MAC 40.

The BMC/MAC module 40 is operable to detect the format of received packets, and to ensure that correct packets are processed. The BMC/MAC module 40 is configured to disregard non-positioning packets. The BMC/MAC module 40 is also configured to cause antenna switching and I and Q sampling to be performed at the appropriate times during reception of a positioning packet.

The MAC part of the BMC/MAC module 40 also constructs the message/packets that include the complex signal parameters, e.g. the I and Q samples. The BMC/MAC module 40 also performs interference detection, as described above.

The switch controller 52 has an output that is connected to a control input of the switch 19. The output of the switch controller 52 thus controls which of the multiple antenna elements 32A-32C are connected to the RF module 35 at a given time. Depending on the signal provided on the output 49 of the BMC/MAC 40, the antenna switching module 39 is controlled either to switch between antenna elements 32A-32C in a desired sequence, or to connect only one of the antenna elements to the RF module 35.

Instead of including the receiver functionality in the base station 30, the receiver may instead be a mobile device. Here, the mobile device does not have a fixed location and orientation. However, the location and/or orientation of transmitting devices, for instance mobile tags, relative to the mobile device can be calculated in the mobile device for use thereby, or can be calculated at a remote location for later use or for provision to the mobile device. The mobile device may be incorporated into a device with other functionality, for instance a mobile phone, smartphone, PDA, netbook, tablet computer, laptop computer etc.

In other embodiments, the receiver is absent an array of antenna elements and a switch, and instead the transmitter has plural antenna elements and a switch arrangement. In these embodiments, the transmitter is controlled to transmit using different ones of the antenna elements in a sequence, and the resulting signals are received at the receiver. In every way, though, the principles of operation are the same as those described above, and the receiver is able to detect interference on the received signals by analysing the received radio signals at time instances that relate to transmissions by different antenna elements or to transmissions from the same antenna element but separated in time with intervening transmissions from different antenna elements. Here, the signal processed at the receiver relates to antenna elements that are at the transmitter side of the system.

The person skilled in the art will appreciate how to construct apparatus implementing these other embodiments. Some details of a particular embodiment will now be described. When using a multi-antenna element transmitter and a single-antenna element receiver, the transmitted positioning packet has a special format and includes a field that informs the receiver which part of the packet is useable for positioning. Switching parameters, including a switching start time, a switching sequence, a switching interval and the data bits that are modulated onto the signal are provided by the transmitter to the receiver, and are used by the receiver in calculating the bearing. The switching parameters may be transmitted by the transmitter as part of the positioning packet, or they may be transmitted separately, for instance in a dedicated positioning information packet. The parameters may alternatively be stored in a database that is accessible to both the transmitter and the receiver, or they may be defined by a standard or proprietary specification.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialised circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed function device, gate array or programmable logic device etc.

The invention claimed is:

1. A method comprising:
   obtaining in-phase and quadrature samples of a received radio signal at at least first and second discrete instances in time;
   processing the samples to provide information relating to an amplitude and/or phase of the received radio signal at the first and second instances in time;
   using the amplitude and/or phase information of the received radio signal at the first and second instances in time to determine whether interference is present on the received radio signal;
   removing modulation and frequency offset from the received signal and then making a comparison of a phase and/or amplitude parameter of a signal relating to a first antenna element at the first instance in time with a corresponding parameter of a signal relating to the first antenna element at the second instance in time; and
   determining whether interference is present on a basis of a result of the comparison.

2. The method as claimed in claim 1, wherein the received signal is a phase or frequency modulated signal, the method comprising forwarding complex signal parameters for processing if interference is determined not to be present; and
   discarding the complex signal parameters without forwarding for processing if interference is determined to be present.

3. A The method as claimed in claim 2, wherein the first and second instances in time are located within a single packet.

4. The method as claimed in claim 2, comprising controlling a switch to connect different ones of plural antenna elements to a radio receiver in a sequence, wherein the first and second instances of time are separated from one another by at least one switching of the switch.

5. The method as claimed in claim 2, comprising making a comparison of an amplitude of a signal of the received radio signal at a third discrete instance in time with an amplitude of a signal at a fourth discrete instance in time, and determining whether interference is present on a basis of a result of both of the comparisons.

6. The method as claimed in claim 5, comprising determining whether interference is present on a basis of results of comparisons of amplitudes of signals for each of the plural antenna elements at different instances in time, and determining whether interference is present on a basis of a result of all of the comparisons.

7. The method as claimed in claim 1, comprising:
controlling a switch to connect different ones of plural antenna elements to a radio receiver in a sequence, wherein the first and second instances of time are separated from one another by at least one switching of the switch;
removing modulation and frequency offset from the received signal and then comparing a phase and/or amplitude parameter of a signal relating to a first antenna element at the first instance in time with a corresponding parameter of a signal relating to the first antenna element at the second instance in time, the first and second instances in time being separated from one another by at least one switching of the switch; and
determining whether interference is present on a basis of a result of the comparison.

8. The method as claimed in claim 1, wherein the first and second instances in time are located within a single packet.

9. The method as claimed in claim 1, comprising making a comparison of a phase and/or amplitude parameter of a signal relating to a second antenna element at a third instance in time with a corresponding parameter of a signal relating to the second antenna element at a fourth instance in time, and determining whether interference is present on a basis of a result of both of the comparisons.

10. The method as claimed in claim 7, comprising making a comparison of a phase and/or amplitude parameter of a signal relating to a second antenna element at a third instance in time with a corresponding parameter of a signal relating to the second antenna element at a fourth instance in time, the third and fourth instances in time being separated from one another by at least one switching of the switch, and determining whether interference is present on a basis of a result of both of the comparisons.

11. The method as claimed in claim 7, comprising determining whether interference is present on a basis of results of comparisons of phase and/or amplitude parameters of signals for each of the plural antenna elements at different instances in time.

12. The method as claimed in claim 11 comprising controlling a switch to sequentially switch different ones of plural antenna elements to connect to a radio receiver, wherein the first and second instances in time are separated from one another by at least one switching of the switch.

13. A non-transitory computer-readable storage medium having a computer program stored thereon, which when executed by a computing apparatus, causes the computing apparatus to perform the method according claim 1.

14. A method comprising:
determining whether interference is present on a currently received phase or frequency modulated signal by comparing an amplitude of a signal relating to a first antenna element at a first instance in time with an amplitude of a signal relating to the first antenna element at a second instance in time;
discarding complex parameters without forwarding for processing if interference is determined to be present; and
if interference is determined not to be present:
removing modulation and frequency offset from the received signal and then determining whether interference is present by comparing a phase of the signal relating to the first antenna element at the first instance in time with a phase of the signal relating to the first antenna element at the second instance in time;
discarding complex parameters without forwarding for processing if interference is determined to be present; and
forwarding the complex parameters for processing if interference is determined not to be present.

15. An apparatus comprising:
means for obtaining in-phase and quadrature samples of a received radio signal at least first and second discrete instances in time;
means for processing the samples to provide information relating to an amplitude and/or phase of the received radio signal at the first and second instances in time;
means for removing modulation and frequency offset from the received signal;
means for making a comparison of a phase and/or amplitude parameter of a signal relating to a first antenna element at the first instance in time with an associated parameter of a signal of the first antenna element at the second instance in time;
means for determining whether interference is present on a basis of a result of the comparison;
means for forwarding complex signal parameters for processing if interference is determined not to be present; and
means for discarding the complex signal parameters without forwarding for processing if interference is determined to be present.

16. An apparatus, the apparatus having at least one processor and at least one memory having computer-readable code stored thereon which when executed controls the at least one processor to perform a method configured to:
obtain in-phase and quadrature samples of a received radio signal at at least first and second discrete instances in time;
process the samples to provide information relating to an amplitude and/or phase of the received radio signal at the first and second instances in time;
use the amplitude and/or phase information of the received radio signal at the first and second instances in time to determine whether interference is present on the received radio signal;
removing modulation and frequency offset from the received signal and then make a comparison of a phase and/or amplitude parameter of a signal relating to a first antenna element at the first instance in time with an associated parameter of a signal of the first antenna element at the second instance in time;
determine whether interference is present on a basis of a result of the comparison;

forward complex signal parameters to be processed if interference is determined not to be present; and dump the complex signal parameters without hesitation if interference is determined to be present.

17. An apparatus, the apparatus having at least one processor and at least one memory having computer-readable code stored thereon which when executed controls the at least one processor:

determine whether interference is present on a currently received phase or frequency modulated signal by compare an amplitude of a signal from a first antenna element at a first instance in time with an amplitude of a signal from the first antenna element at a second instance in time;

dump complex parameters without hesitation if interference is determined to be present; and if interference is determined not to be present:

removing modulation and frequency offset from the received signal and then determine whether interference is present by comparing a phase of the signal from the first antenna element at the first instance in time with a phase of the signal from the first antenna element at the second instance in time;

dump complex parameters without hesitation if interference is determined to be present; and to pass on the complex parameters for processing if interference is determined not to be present.

18. A non-transitory computer-readable storage medium having stored thereon computer-readable code, which, when executed by computing apparatus, causes the computing apparatus to perform a method comprising:

obtaining in-phase and quadrature samples of a received radio signal at at least first and second discrete instances in time;

processing the samples to provide information relating to an amplitude and/or phase of the received radio signal at the first and second instances in time;

using the amplitude and/or phase information of the received radio signal at the first and second instances in time to determine whether interference is present on the received radio signal;

discarding complex parameters without forwarding for processing if interference is determined to be present; and if interference is determined not to be present:

removing modulation and frequency offset from the received signal and then determining whether interference is present by making a comparison of a phase of a signal relating to the first antenna element at the first instance in time with a phase of a signal relating to the first antenna element at the second instance in time;

discarding complex parameters without forwarding for processing if interference is determined to be present; and forwarding complex parameters for processing if interference is determined not to be present.

19. An apparatus, comprising:

a controller;

plural antenna elements;

a switch having plural inputs and an output;

a radio receiver configured to provide in-phase and quadrature complex parameters of received signals;

wherein the antenna elements are connected to respective inputs of the switch and the radio receiver is connected to the output of the switch, the controller being configured:

to obtain in-phase and quadrature samples of a received radio signal at at least first and second discrete instances in time;

to process the samples to provide information relating to an amplitude and/or phase of the received radio signal at the first and second instances in time;

to use the amplitude and/or phase information of the received radio signal at the first and second instances in time to determine whether interference is present on the received radio signal;

to forward the complex signal parameters for processing if interference is determined not to be present; and to discard the complex signal parameters without forwarding for processing if interference is determined to be present.

20. An apparatus, comprising:

a controller;

plural antenna elements;

a switch having plural inputs and an output;

a radio receiver configured to provide in-phase and quadrature complex parameters of received signals; wherein the antenna elements are connected to respective inputs of the switch and the radio receiver is connected to the output of the switch, the controller being configured:

to determine whether interference is present on a currently received phase or frequency modulated signal by comparing an amplitude of a signal relating to a first antenna element at a first instance in time with an amplitude of a signal relating to the first antenna element at a second instance in time;

to discard the complex parameters without forwarding for processing if interference is determined to be present; and if interference is determined not to be present:

to remove modulation and frequency offset from the received signals and then determine whether interference is present by comparing a phase of the signal relating to the first antenna element at the first instance in time with a phase of the signal relating to the first antenna element at the second instance in time;

to discard the complex parameters without forwarding for processing if interference is determined to be present; and to forward the complex parameters for processing if interference is determined not to be present.

* * * * *

UNITED STATES PATENT AND TRADEMARK OFFICE
CERTIFICATE OF CORRECTION

PATENT NO. : 8,948,238 B2
APPLICATION NO. : 13/883809
DATED : February 3, 2015
INVENTOR(S) : Ville Valtteri Ranki et al.

It is certified that error appears in the above-identified patent and that said Letters Patent is hereby corrected as shown below:

On the title page item, "(75) Inventors:", please add a space between "Tapani" and "Kainulainen" in the second inventor's name so that the second inventor's name reads as follows:

Antti Paavo Tapani Kainulainen

Signed and Sealed this
Twenty-sixth Day of May, 2015

Michelle K. Lee
*Director of the United States Patent and Trademark Office*